United States Patent
Pelletier et al.

(10) Patent No.: US 8,370,462 B2
(45) Date of Patent: Feb. 5, 2013

(54) SERVICE CONFIGURATION ASSURANCE

(75) Inventors: Stephan Pelletier, Gatineau (CA);
Mircea Pana, Ottawa (CA); Ian Butt, Kanata (CA)

(73) Assignee: Oracle International Corporation, Redwood Shores, CA (US)

(*) Notice: Subject to any disclaimer, the term of this patent is extended or adjusted under 35 U.S.C. 154(b) by 528 days.

(21) Appl. No.: 12/322,458

(22) Filed: Feb. 3, 2009

(65) Prior Publication Data
US 2010/0195537 A1    Aug. 5, 2010

(51) Int. Cl.
*G06F 15/177* (2006.01)
*G06F 15/173* (2006.01)

(52) U.S. Cl. .................... 709/220; 709/224

(58) Field of Classification Search ........... 709/220, 709/221, 224
See application file for complete search history.

(56) References Cited

U.S. PATENT DOCUMENTS

| | | | |
|---|---|---|---|
| 6,421,719 B1 * | 7/2002 | Lewis et al. | 709/224 |
| 7,552,201 B2 * | 6/2009 | Areddu et al. | 709/220 |
| 2002/0021675 A1 * | 2/2002 | Feldmann | 370/254 |
| 2007/0198665 A1 * | 8/2007 | De Matteis et al. | 709/220 |
| 2009/0204692 A1 * | 8/2009 | Smith et al. | 709/221 |

* cited by examiner

*Primary Examiner* — Phuoc Nguyen
*Assistant Examiner* — Kishin G Belani
(74) *Attorney, Agent, or Firm* — Kraguljac Law Group, LL

(57) ABSTRACT

Systems, methods, and other embodiments associated with service configuration assurance are described. One example method includes generating an expected device configuration model based at least in part on service information for a network device. The example method may also include comparing this expected device configuration model with an actual device configuration model for the network device. The example method may also include generating a service-impact event notification when a likely service-impacting configuration change is detected.

24 Claims, 16 Drawing Sheets

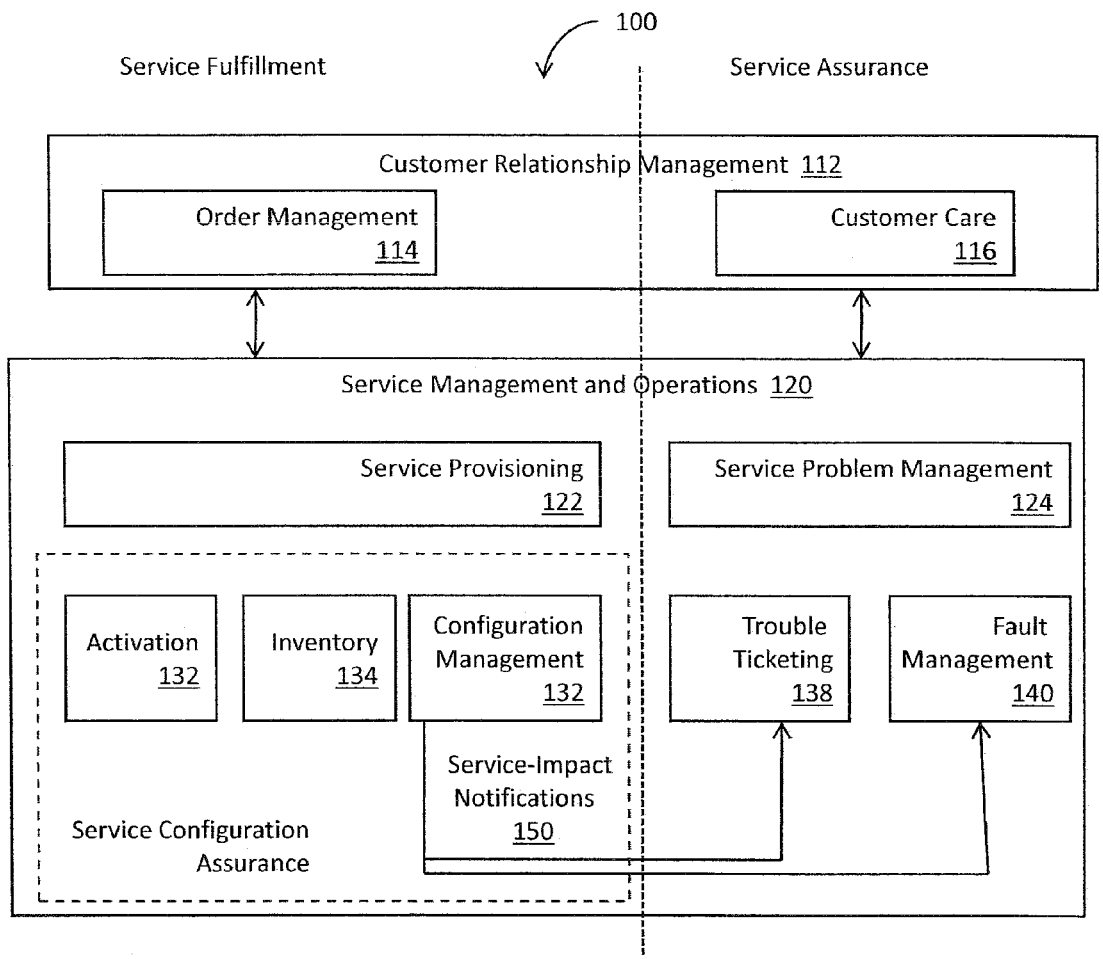
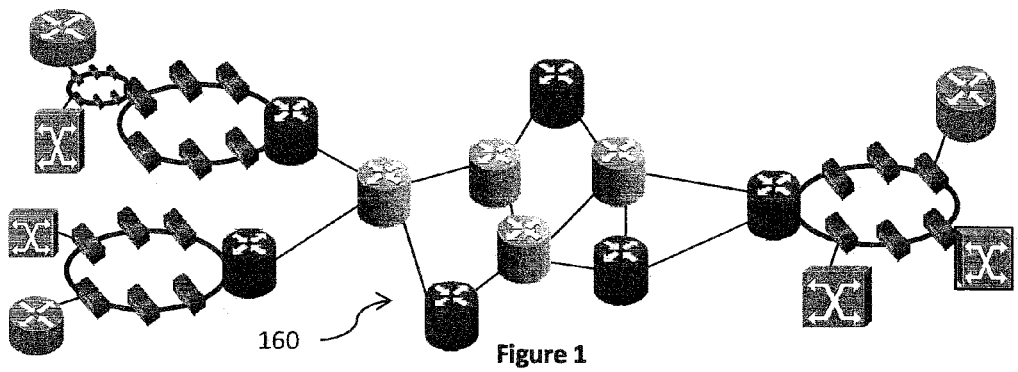
Figure 1

Configuration Archives | Archive Policy | Change Tracking | Change Log

Achive View

Achive for device rot3620-1 completed at 11/05/2008 04:50 PM

- rot3620-1
  - EnableChangeTracki
  - VPN One
  - loginbanner

```
ip vrf IPSA_1:4086
  rd 1:4086
  route-target export 1:4314
  route-target import 1:4314

Interface Ethernet1/2
  ip vrf forwarding IPSA_1:4086
  ip address 10.0.0.2 255.255.255.0 router bgp 1
  address-family ipv4 vrf IPSA_1:4086
    no auto-summary
    no synchronization
  exit-address-family
```

Name: rot3620-1

Description:
Cisco Internetwork
Operating System
Software <br/>IOS (tm)
3600 Software (C3620-IK9O3S7-M), Version
12.2(15)T9, RELEASE
SOFTWARE IP Address: 10.156.68.63

State: Managed

Archive Properties

Device: rot3620-1
Status: Completed
Archive Start Time: 11/05/2008 04:50 PM
Archive End Time: 11/05/2008 04:50 PM
Id: 103
Device Type: Cisco 3620

Display Options: ☐ Show Compliance ☐ Show All

[Compare To Current] [Compare To Latest] [Compare To Previous] [Restore Archive]

[View Current Config]

Bold: Matching Commands
*Bold Italics:* Missing Commands
*Italics:* Extraneous Commands

Figure 12

SERVICE CONFIGURATION ASSURANCE

BACKGROUND

Historically, IP Service Providers have assured their customers that service-level obligations have been met by intensively monitoring the network for fault and performance issues. Such real-time network management typically involves hardware fault monitoring, which can identify, for example, hardware events such as a card pulled from a network device. In addition, certain performance parameters are monitored on network devices and links, which can identify potential network degradations. While such fault and performance monitoring is well embedded in Service Provider processes and detects many service problems, a whole category of equivalently important network events that can lead to service-impacting situation most often goes fully unnoticed and unmanaged: manual configuration changes.

In IP and Ethernet networks especially, a significant number of service problems are caused by uncontrolled manual configuration changes, performed by one of the many operators who have access to the equipment in the network, or sometimes by customers themselves in the case of customer premise equipment. In some situations, a manual configuration results in a service outage or a performance degradation. Some manual configurations may introduce security risks or other types of network and service vulnerabilities. For example, an operator might delete a customer routing table from an IP Virtual Private Network (VPN) service from a device configuration, which would create a service outage for one or many customer sites using this service. As another example, the operator might inappropriately change an IP "quality of service" configuration, which would directly affect service performance. These types of service-impacting configuration changes generally happen "silently" and go undetected until a customer complains, and which often directly affect the service-level obligations of a Service Provider.

Communication Service Providers (CSP) such as, for example, IP Service Providers, have dealt with uncontrolled configuration changes by trying to limit the operators' direct access to the network. However, it is difficult to limit operator access in highly distributed networks like IP and Ethernet networks, where service configurations are very complex and operators are accustomed to working directly with network devices. Controlled automated service provisioning helps a great deal in this area, but still many operators will go through the back-door, i.e. log directly in to a device and make manual configuration changes. Real-time monitoring of general configuration changes on a per-device basis has not been widely used in a service assurance capacity. This is due, at least in part, to the fact that such monitoring of all configuration changes generates an overwhelming amount of data, the vast majority of which will not ultimately affect service.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 1 illustrates an example environment in which example systems and methods for service configuration assurance, and equivalents, may operate.

FIG. 12 illustrates an embodiment of a user interface display associated with service configuration assurance.

DETAILED DESCRIPTION

Figure 2:
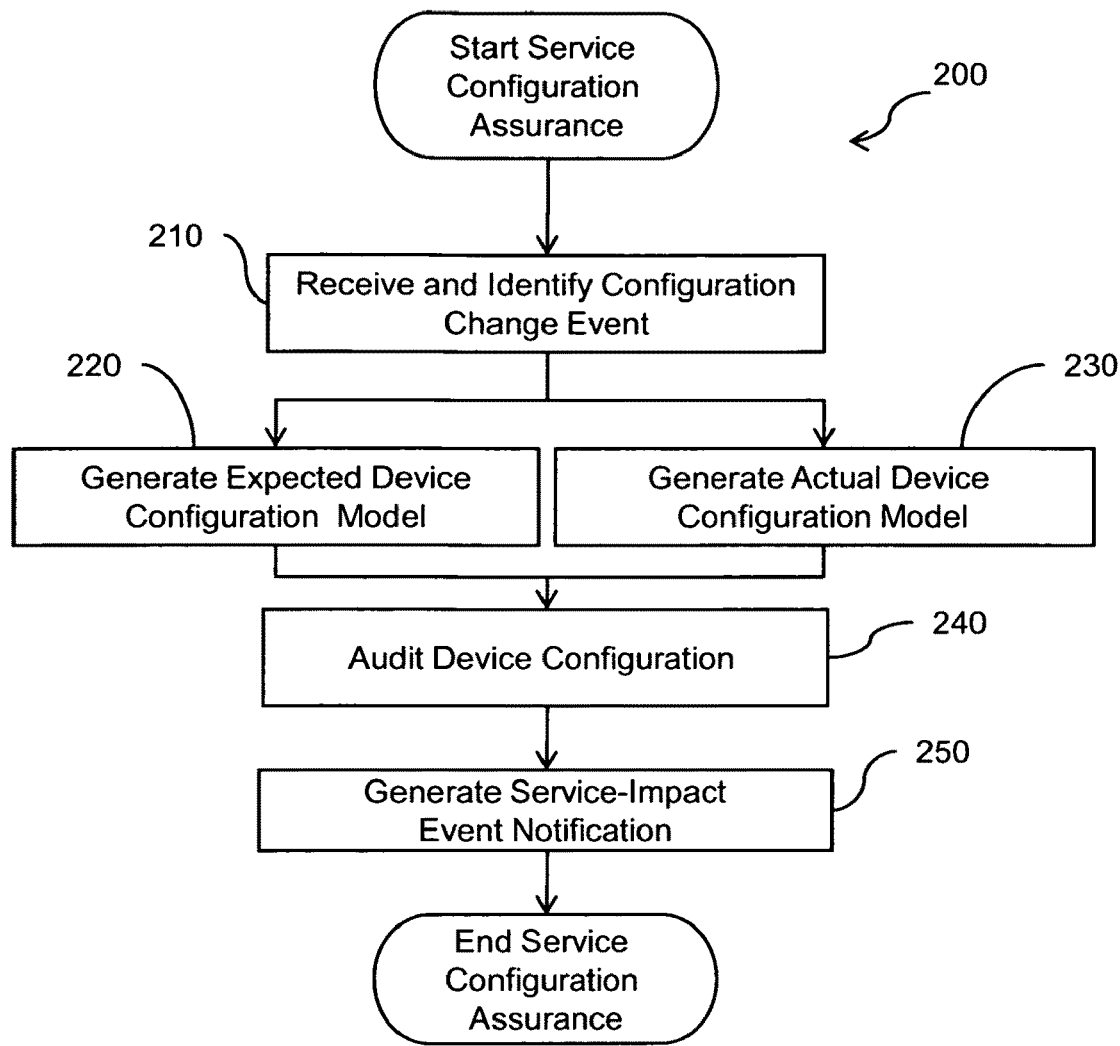
FIG. 2 illustrates another embodiment of a method associated with service configuration assurance.

A service configuration assurance system provides the ability to monitor network configuration changes, identify likely service-impacting changes, and communicate such service-impacting changes in real-time, possibly along with additional customer, service and network information. Service-impacting configuration changes on a network device can be efficiently identified by generating an expected device configuration model and an actual device configuration model. The expected device configuration model is created by retrieving up-to-date service information from an inventory system and re-generating the service configuration model as would a service activation system. The actual device configuration model is created by retrieving the whole configuration from the network device, parsing it out and identifying all service items from the configuration, using the service configuration modeling patterns, and merging them into a full actual device configuration model.

The actual and expected device configuration models can then be compared and all non-matching service configuration items can be identified. New, missing, and modified service instances in the actual device configuration model are then identified and communicated, optionally along with additional customer, service and device information. In this manner, configuration changes that are likely service-impacting are identified and singled out from the many configuration changes constantly being made to network devices. Service-impact events are compiled and can be communicated in real-time to users or other systems, such as fault management or trouble ticketing systems.

FIG. 1 illustrates an example embodiment of a computing system 100 detailing the environment surrounding service configuration assurance, which includes integrated functions from the service provisioning layer 122 including configuration management 132, inventory 134 and activation 134. Service configuration assurance lies in the service management and operations layer 120, often referred to as "operations support systems" (OSS) in the communication field. Service management and operations 120 interfaces with the network 160 where the customer services are configured and also with the customer relationship management layer 112 as part of the business support systems (BSS). Identified and processed service-impacting configuration changes can be sent as service-impact notifications or alerts 150, and received by service assurance systems in the service problem layer 124, such as fault management 140 and trouble ticketing 138 systems, where the service-impact event can be tracked to resolution and closure. Addressing such problems may involve restoring the service in the network or updating the customer service inventory, in which case the customer may be contacted to let them know of an intended service change not processed as a service order. Many configuration change problem instances will directly affect the service level agreement reported and managed via the customer care function 116, hence the delays from problem identification to resolution should be minimized.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

"Computer component", as used herein, refers to a computer-related entity (e.g., hardware, firmware, software in execution, combinations thereof). Computer components may include, for example, a process running on a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instructions stored on computer-readable media that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

As used herein, an operations support system (OSS) is a system that enables customer service providers (CSPs) to manage, monitor and/or control communications networks and the services that they offer to their customers by means of these networks. Service management considerations include handling new subscribers, service activation with subsequent service assurance.

As used herein, a communications inventory system is an OSS system responsible for the management of network resources and services in complex communications environments.

As used herein, a communications network is a network of communications links and nodes (network elements) arranged so that messages may be passed from one part of the network to another over multiple links and through various nodes.

As used herein, a communication service is a service offered by a communications service provider to its customers. These services are typically realized through the configuration of one or more network devices in a coordinated fashion.

As used herein, a communications service provider (CSP) is a company the transports information electronically. The term encompasses public and private companies in the wireline, wireless, Internet, cable, satellite, and managed service businesses.

As used herein, a configuration item is a basic element of device configuration. A configuration item carries distinct semantics that affect the operation of the device. It may exist in the context of another configuration item and it may have a specific type and a number of parameters.

As used herein, a configuration management system is an OSS system responsible for the configuration of network devices. Functions of a configuration management system include backup and restore, versioning, change detection and quality control for the network device configuration that is associated directly or indirectly with the services delivered by a CSP to its customers.

As used herein, a configuration model is a set of configuration items and their relationships organized in a specific structure. The configuration model defines how a device shall process messages and events when these occur at its interfaces with the network.

As used herein, a configuration modeling equivalence rule is a rule that identifies the semantic equivalence of a service configuration item or a set of service configuration items in the context of a configuration model.

As used herein, a configuration modeling pattern is a pattern that identifies the unique structure of a service configuration item in the context of a configuration model.

As used herein, an element management system (EMS) includes systems and applications that are concerned with managing network elements (NE) on the network element management layer of the Telecommunication Management Network model.

As used herein, Ethernet is a family of frame-based computer networking technologies for local area networks (LANs) or metropolitan networks. The name comes from the physical concept of ether. It defines a number of wiring and signaling standards for the physical layer of the OSI networking mode, through means of network access at the Media Access Control (MAC)/Data Link Layer, and a common addressing format.

As used herein, a fault management system is an OSS system responsible for the detection, isolation, and correction of malfunctions in a communications network, and compensation for environmental changes. Its functions include maintaining and examining error logs, accepting and acting on error detection notifications, tracing and identifying faults, carrying out sequences of diagnostics tests, correcting faults, reporting error conditions, and localizing and tracing faults by examining and manipulating multiple sources of information.

As used herein, internetworking protocol (IP) is a protocol used for communicating data across a packet-switched internetwork using the Internet Protocol Suite, also referred to as TCP/IP. IP is the primary protocol in the Internet Layer of the Internet Protocol Suite and has the task of delivering distinguished protocol datagrams (packets) from the source host to the destination host based on their addresses.

As used herein, likely service-impacting configuration changes are changes that will likely cause service degradation. Even in instances where the resulting service still meets the service-level agreement between a service provider and its customer, the likely service-impacted changes identified by the methods and systems described herein should still be addressed. The network devices should be correctly configured or the service definitions should be updated in inventory in order to maintain the integrity between the service definitions in the OSS and BSS layers and the service implementation on network devices.

As used herein, manual device configuration is a configuration installed on a network device by a non-OSS source. This configuration may be installed in an interactive or automated way, by a network operator (actual person) or via scripts or other automation means. Typically, manual configurations are ad-hoc changes, with little or no quality assurance and hence are prone to human errors.

As used herein, a network device (element) means a facility or equipment used in the provision of a telecommunications service. The term also includes features, functions, and capabilities that are provided by means of facilities or equipment including subscriber numbers, databases, signaling systems, and information sufficient for billing and collection or used in the transmission or routing or other provision of a telecommunications service.

As used herein, network management system (NMS) is a combination of hardware and software used to monitor and administer a network.

As used herein, OSS-driven device configuration is a configuration installed on a network device by an OSS system as a result, or in expectation of a customer service request. Typically the OSS systems responsible for configuring network devices are the service activation systems and configuration management systems. OSS-driven configuration is automated, rule-based, and undergoes significant quality assurance testing. Hence, this type of configuration will reflect the service intent in the majority of cases.

As used herein, a service activation system is an OSS system responsible for the orchestrated configuration of network elements with the objective of enabling complex communications services across multiple technology domains for both wireline and wireless service providers.

As used herein, service assurance is responsible for the execution of proactive and reactive maintenance activities to ensure that services provided to customer are continuously available and to service level agreement (SLA) or quality of service (QoS) performance levels.

As used herein, a service configuration is the set of service configuration items, in the context of a configuration model, that represent the intent, or realize a service.

As used herein, service fulfillment is responsible for providing customers with their requested services in a timely and correct manner.

As used herein, a service-impacting configuration change is a change to one or more service configuration items that affects the intent and/or the quality of the corresponding services.

As used herein, a service instance is a concept that associates a service to its potential realization on a network device. A service definition may have multiple instantiations, one for each device where the service is applied. Each service instance may carry a state that reflects the status of its realization.

As used herein, service management and operations is an area of OSS that focuses on the knowledge of service (access, connectivity, content, etc.) and includes all functionalities necessary for the management and operations of communications networks and information services required by or proposed to customers.

As used herein, service problem management is an area of OSS that focuses on customer affecting service problems or failures in order to minimize their negative impact on the customers. A service problem management system manages, monitors, and controls the evolution of a service problem with the goal of restoring the nominal service parameters.

As used herein, a service provisioning system is an OSS system responsible for the orchestration of actions in a number of communications systems with the objective of executing a service order.

As used herein, a trouble ticketing system (sometimes called a trouble reporting system) is a system used in an organization to track the detection, reporting, and resolution of some type of problem. Communications service providers typically associate trouble ticketing systems with customer relationship management (CRM) environments or with network operations centers (NOCs).

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
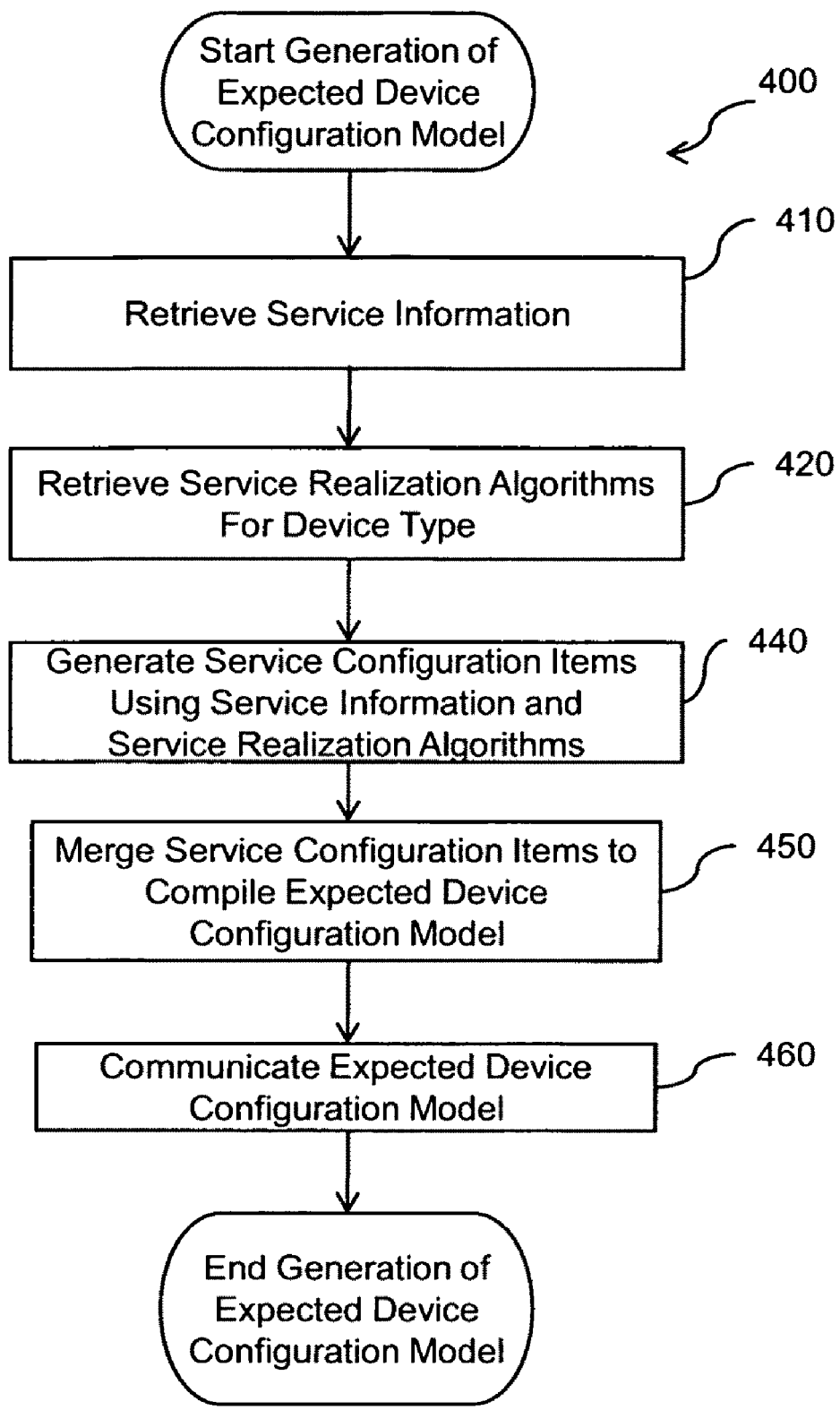
FIG. 4 illustrates another embodiment of a method associated with service configuration assurance.
Figure 5:
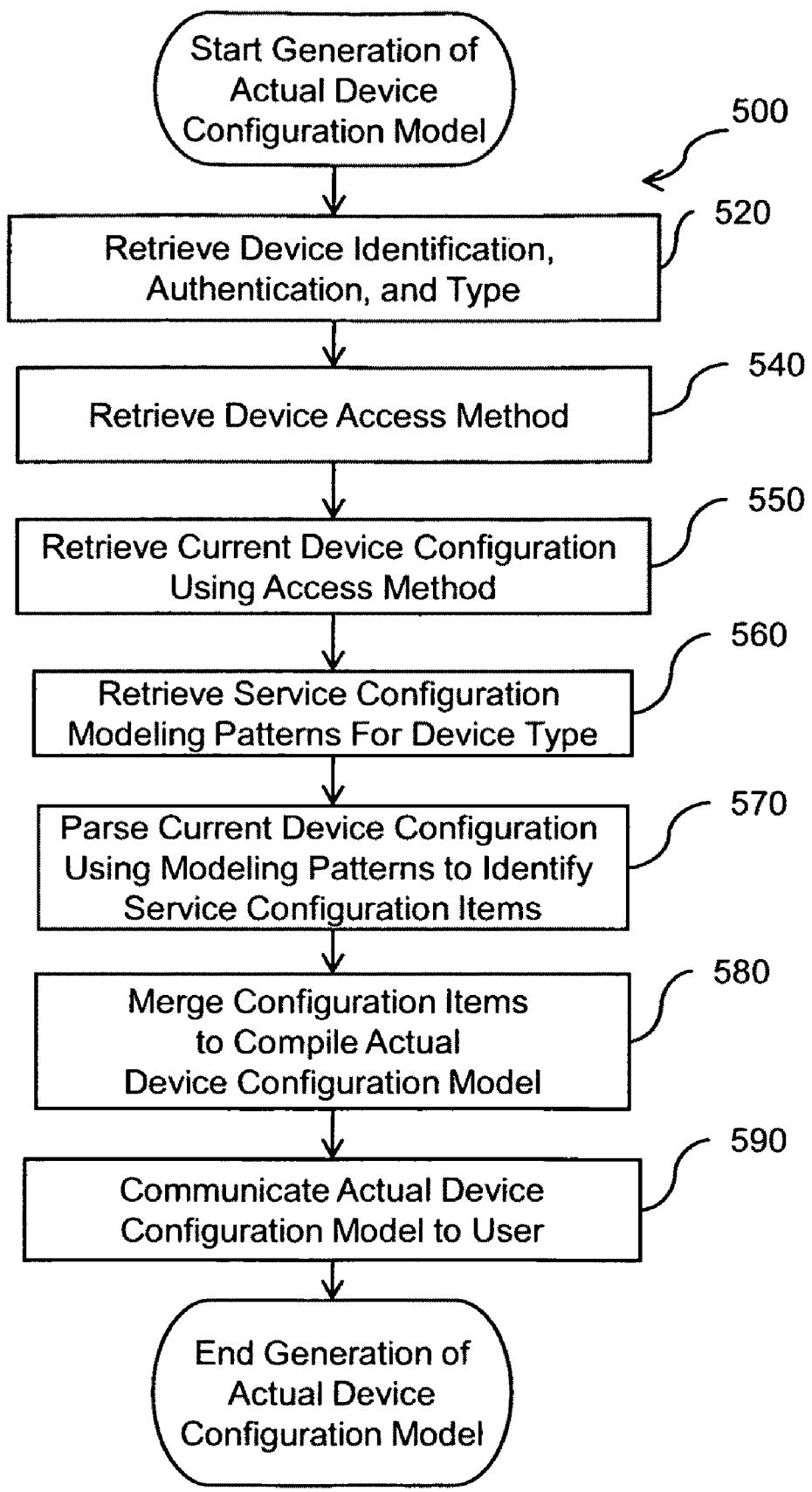
FIG. 5 illustrates another embodiment of a method associated with service configuration assurance.

FIG. 2 illustrates one embodiment of a method 200 that provides service configuration assurance. At 210 a configuration change event is received and identified. The configuration change event may be received from a filtering process that selects likely service-impacting changes from among all of the configuration changes that are occurring on all monitored network devices. One such filtering process is outlined in FIG. 3. At 220, an expected device configuration model is generated for the network device affected by the configuration change event. FIG. 4 outlines one method that can be used to generate the expected device configuration model. At 230, an actual device configuration model is generated for the network device affected by the configuration change event. FIG. 5 outlines one method that can be used to generate the actual device configuration model.

Figure 6A:
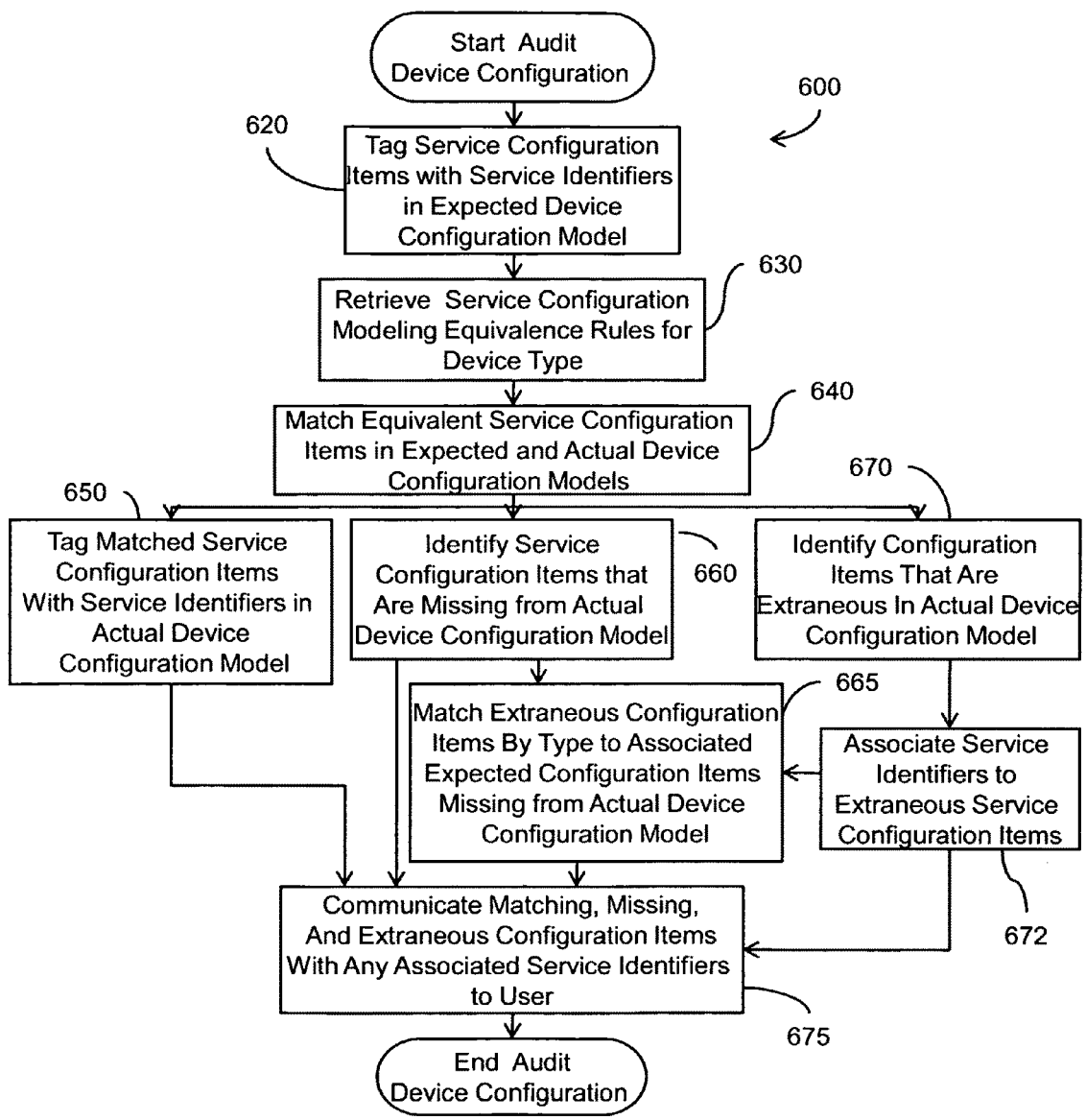
FIGS. 6A and 6B illustrate other embodiments of a method associated with service configuration assurance.
Figure 6B:
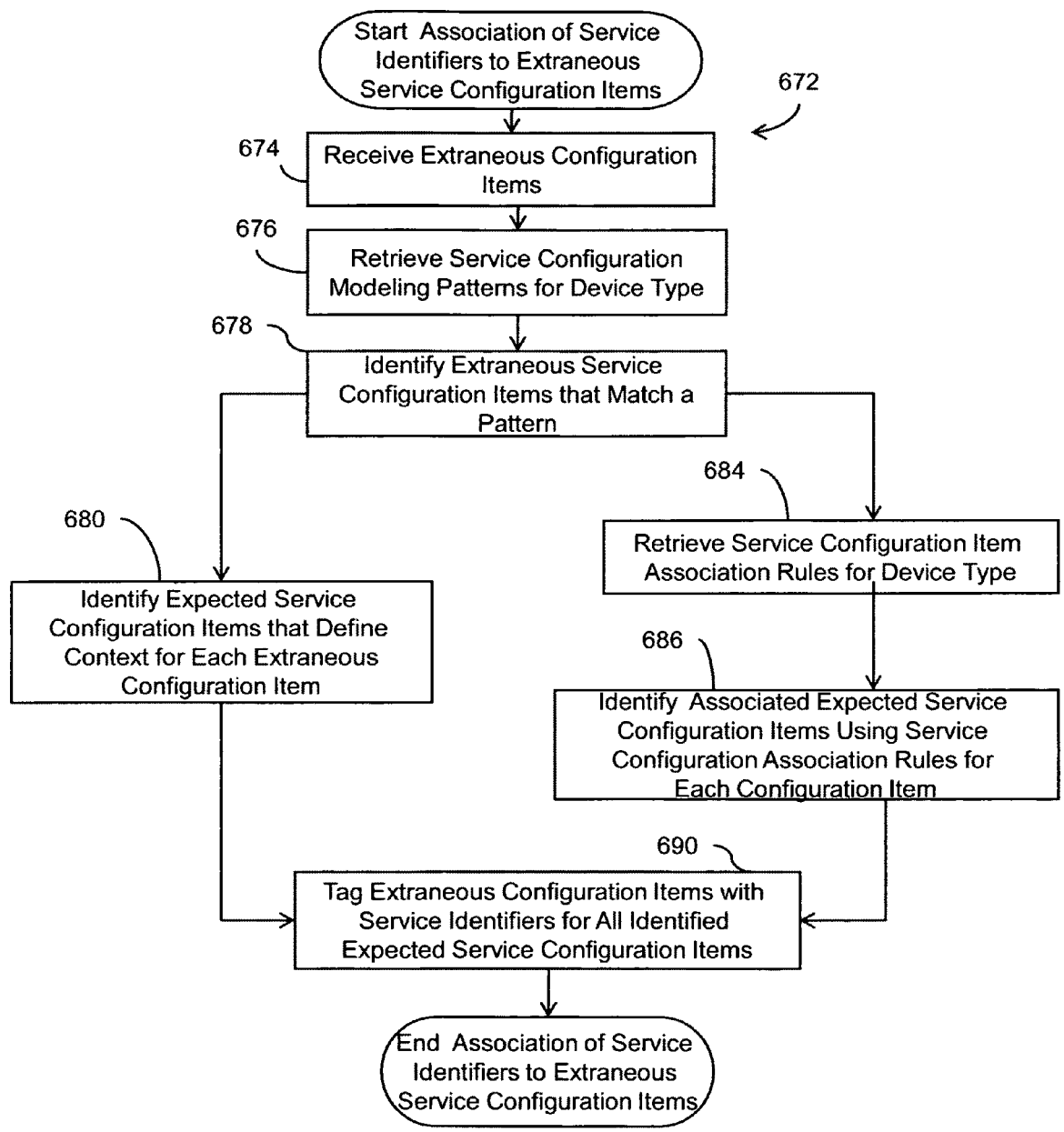
Figure 7:
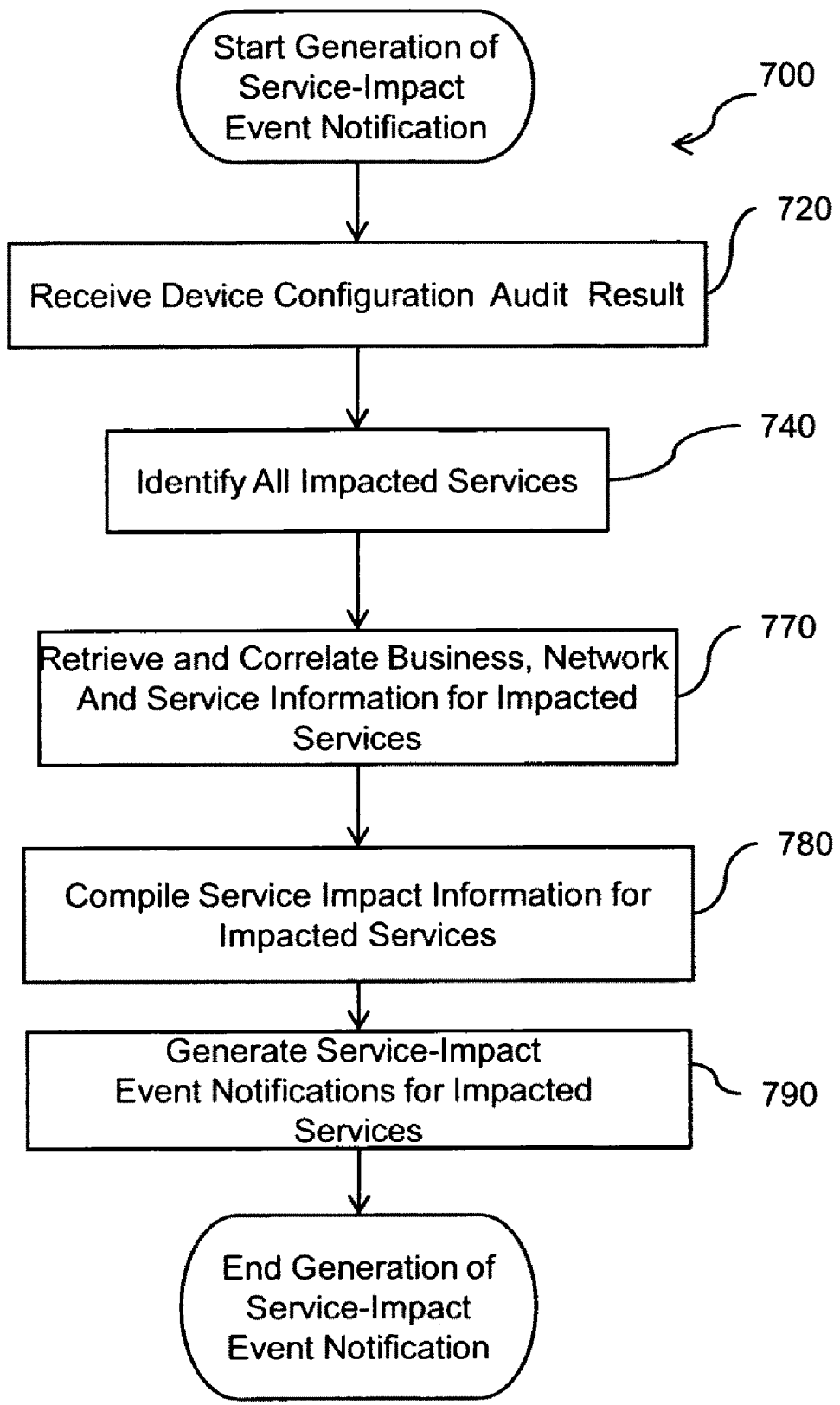
FIG. 7 illustrates another embodiment of a method associated with service configuration assurance.

At 240, the actual device configuration model is audited based on the expected device configuration model. FIGS. 6A and 6B outline one method that may be used to audit the actual device configuration model based on the expected device configuration model. At 250, a service-impact event notification is generated. FIG. 7 outlines one method that can be used to generate a service-impact event notification. The service-impact event notification may include business, network and service information, actual vs. expected service configuration, the identity of the user that made the configuration change.

Figure 3:
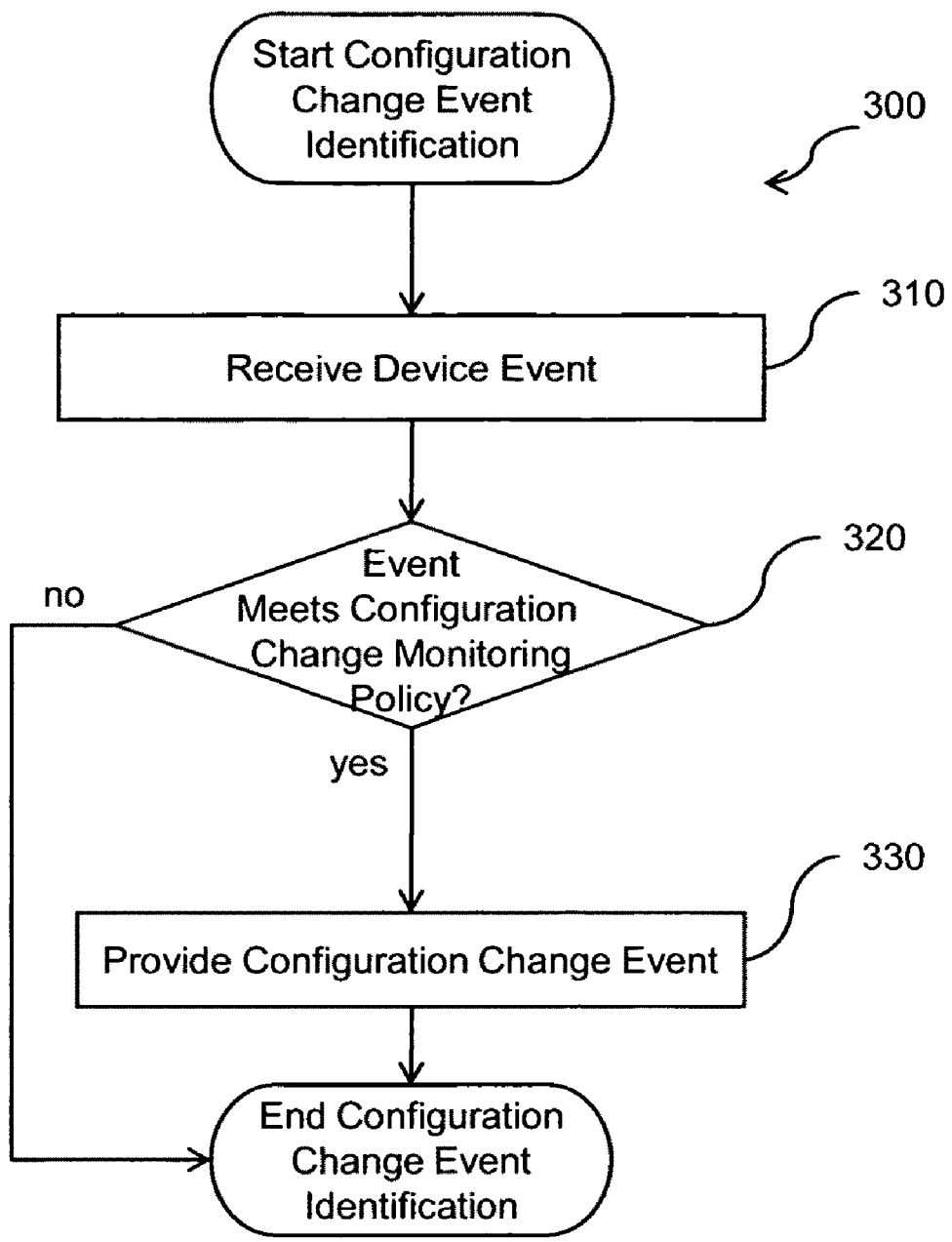
FIG. 3 illustrates another embodiment of a method associated with service configuration assurance.

FIG. 3 illustrates one embodiment of a method 300 that "filters" device events to identify device events that are likely service-impacting configuration change events that should trigger an audit of the actual device configuration model based on the expected device configuration model. At 310, a device event is received. In one embodiment, all device events for the network device are monitored from log events, such as a syslog. At 320, the device event is evaluated according to rules of a monitoring policy. For example, the monitoring policy may trigger the audit process when manual changes are made, changes are made by certain users, or changes are made to certain devices. In addition, a waiting period may be specified in the monitoring policy so that the audit process is not triggered until the waiting period has elapsed and all consecutive device configuration changes have been received. At 330, device events that have been identified by the monitoring policy as likely service-impacting configuration change events are provided for further processing by the service configuration assurance method.

FIG. 4 illustrates an embodiment of a method 400 that is performed to generate the expected device configuration model for a network device. Method 400 includes, at 410, retrieving service information associated with the network device. At 420, service realization algorithms associated with the network device type are retrieved. Service information may include one or more service definitions associated with the network device. These service definitions may be available in an inventory of user services and network devices. Service realization algorithms are typically specific to each type of device.

The method 400 includes, at 440, generating one or more expected service configuration items for the network device based at least in part on the retrieved service information and service realization algorithms. These service configuration items may be thus generated for all services expected on the device instance. In the described method 400, the expected device configuration model is generated based at least in part on the service definition and/or service realization algorithms. It will be understood by one of skill in the art that the phrase "based at least in part on" means that the expected device configuration model may be generated based solely upon the service definition and/or service realization algorithms or based upon service definition and/or service realization algorithms in combination with other information. In addition, one or more additional processing steps may be utilized to generate the expected device configuration model based on the service definition and/or service realization algorithms.

The method includes, at 450, merging the expected service configuration items to compile an expected device configuration model for the network device and, at 460, communicating the expected device configuration model. This communication step may be performed by transmitting or displaying the expected device configuration model to a user or another service configuration assurance method. The expected device configuration model may also be saved for use by other processes.

Figure 11:
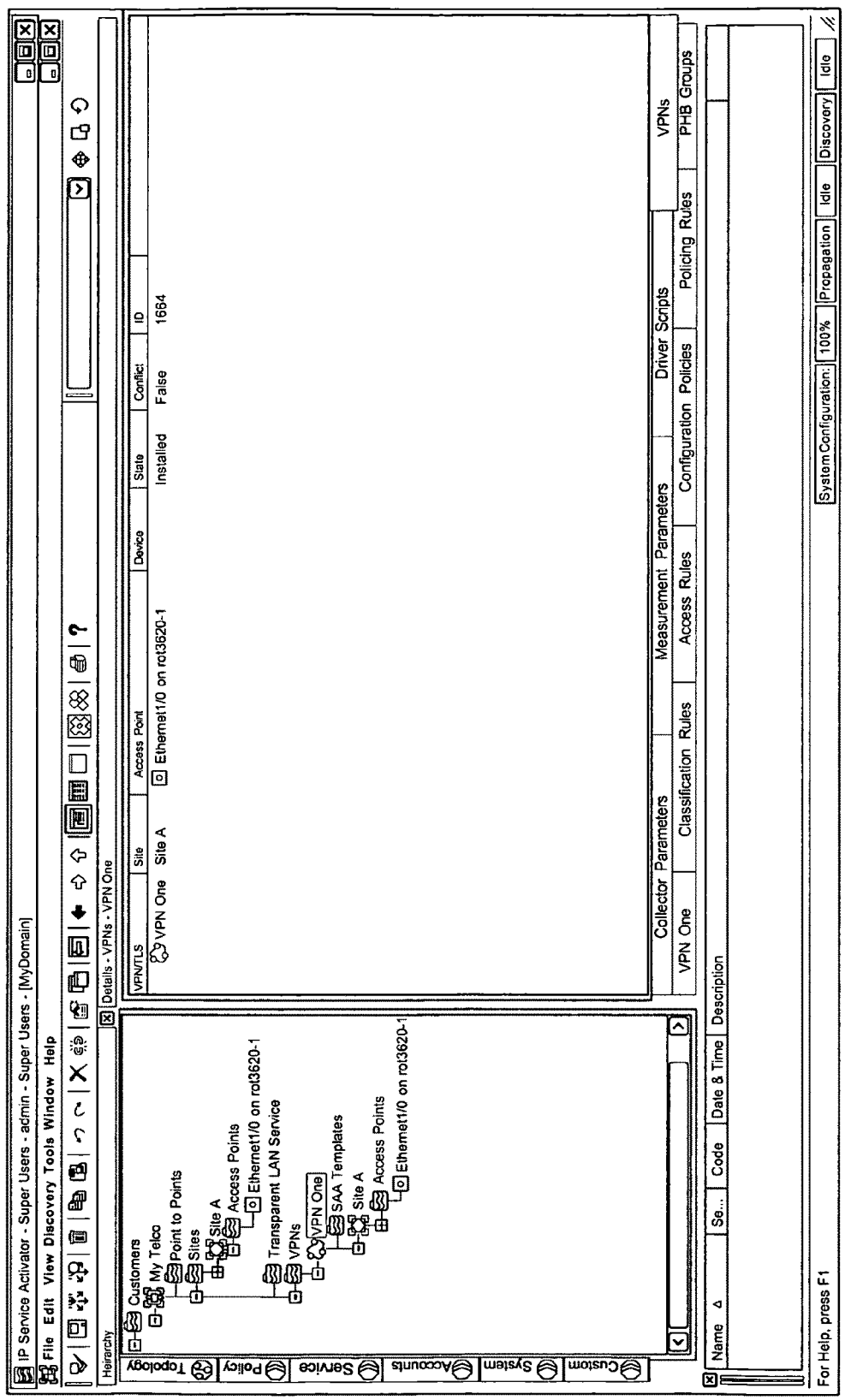
FIG. 11 illustrates an embodiment of a user interface display associated with service configuration assurance.

FIG. 11 illustrates an example user interface display screen that can be used to present information regarding service model entities, relationship and configuration state, representing the expected service. A view is shown that depicts actual service configuration state for a device named rot-3620-1 that implements an instance of the service definition named "VPN One". The service definition and/or service realization algorithms for VPN One can be used to generate an expected device configuration model for the device rot-3620-1. Of course, device rot-3620-1 may also be used to implement other services as well. In that case, other services would be listed on this screen.

FIG. 5 illustrates an embodiment of a method 500 that can be performed to generate an actual device configuration model for a network device. Method 500 may include, at 520, retrieving a device identification, authentication, and type for the network device. This information may be retrieved from a network device inventory. The method 500 may include, at 540, retrieving a device access method. The device access method may be retrieved for the network device from a library of device access methods. At 550 a current device configuration may be retrieved from the network device using the device access method. This current device configuration includes all configuration items that are currently in use on the network device, many of which may not be specifically related to the services being provided by the network device. To focus on those configuration items that are related to service, at 560, one or more service configuration modeling patterns specific to the network device are retrieved and at 570 the one or more service configuration modeling patterns are used to parse the current device configuration to identify service configuration items. At 580 the identified configuration items are merged to compile an actual device configuration model of the network device. At 590, the actual device configuration model is communicated to the user.

FIG. 6A outlines an embodiment of a method 600 that can be used to audit the actual device configuration model based on the expected device configuration model. At 620 service configuration items in the expected device configuration model are tagged with corresponding unique service identifiers. At 630 service configuration modeling equivalence rules are retrieved for the device type. At 640, the configuration items found in actual device configuration model are matched against expected service configuration items in the expected device configuration model using the configuration modeling equivalence rules, if and when needed.

At 650 service configuration items in the actual device configuration model that match an expected service configuration item in the expected device configuration model are tagged with the service identifier for the corresponding expected service configuration item. At 675, these matching service configuration items and service identifiers are communicated to the user. At 660 expected service configuration items in the expected device configuration model that do not have a corresponding service configuration item in the actual device configuration model are identified as missing from the actual device configuration model. At 675 these missing service configuration items are communicated to the user. At 670 configuration items in the actual device configuration model that do not have a corresponding expected configuration in the expected device configuration model are identified as extraneous. At 672, service identifiers are associated to service related extraneous configuration items using a method that is described in FIG. 6B. At 675, extraneous configuration items and any service identifiers associated with them (determined using the method of 672 in FIG. 6B) are communicated to the user. At 665, extraneous configuration items are matched by type to associated expected service configuration items that were identified as missing in the actual service configuration model in step 660. At 675, any matching pairs of expected and actual service configuration items and their corresponding service identifiers are communicated to a user.

FIG. 6B illustrates an embodiment of a method 672 that can be used to associate extraneous configuration items with services that to which they may be related. At 674 the extraneous configuration item is received. At 676, service configuration modeling patterns are retrieved for the device type. At 678, extraneous service configuration items that match a service configuration modeling pattern are identified. The service configuration modeling patterns retrieved at 676 as well as extraneous configuration items that match a service configuration modeling pattern identified at 678 may have already been identified during generation of the actual device configuration model (see FIG. 5, blocks 560, 570). At 684, service configuration item association rules are retrieved for the device type. At 686, for each extraneous configuration item associated expected service configuration items are identified using the service configuration association rules. At 690, the extraneous configuration item is tagged with service identifiers for all identified expected service configuration items. These extraneous configuration items and the service identifiers are communicated at 675 in FIG. 6A. At 680 expected service configuration items that define a context for the extraneous service configuration item are identified. At 690, the extraneous configuration item is tagged with service identifiers for all identified expected service configuration items. These extraneous configuration items and their service identifiers are communicated to the user at 675 in FIG. 6A.

Figure 13:
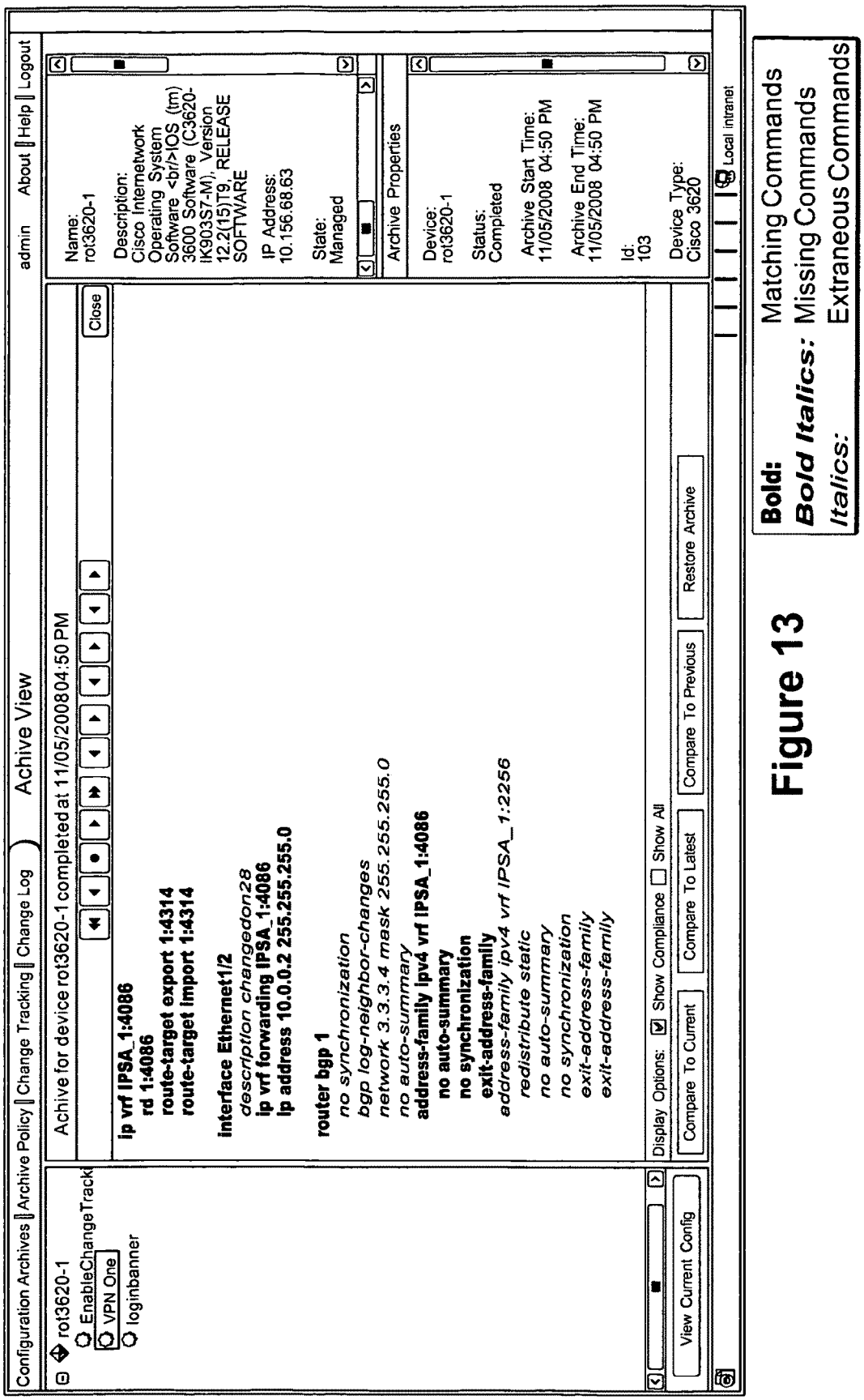
FIG. 13 illustrates an embodiment of a user interface display associated with service configuration assurance.
Figure 14:
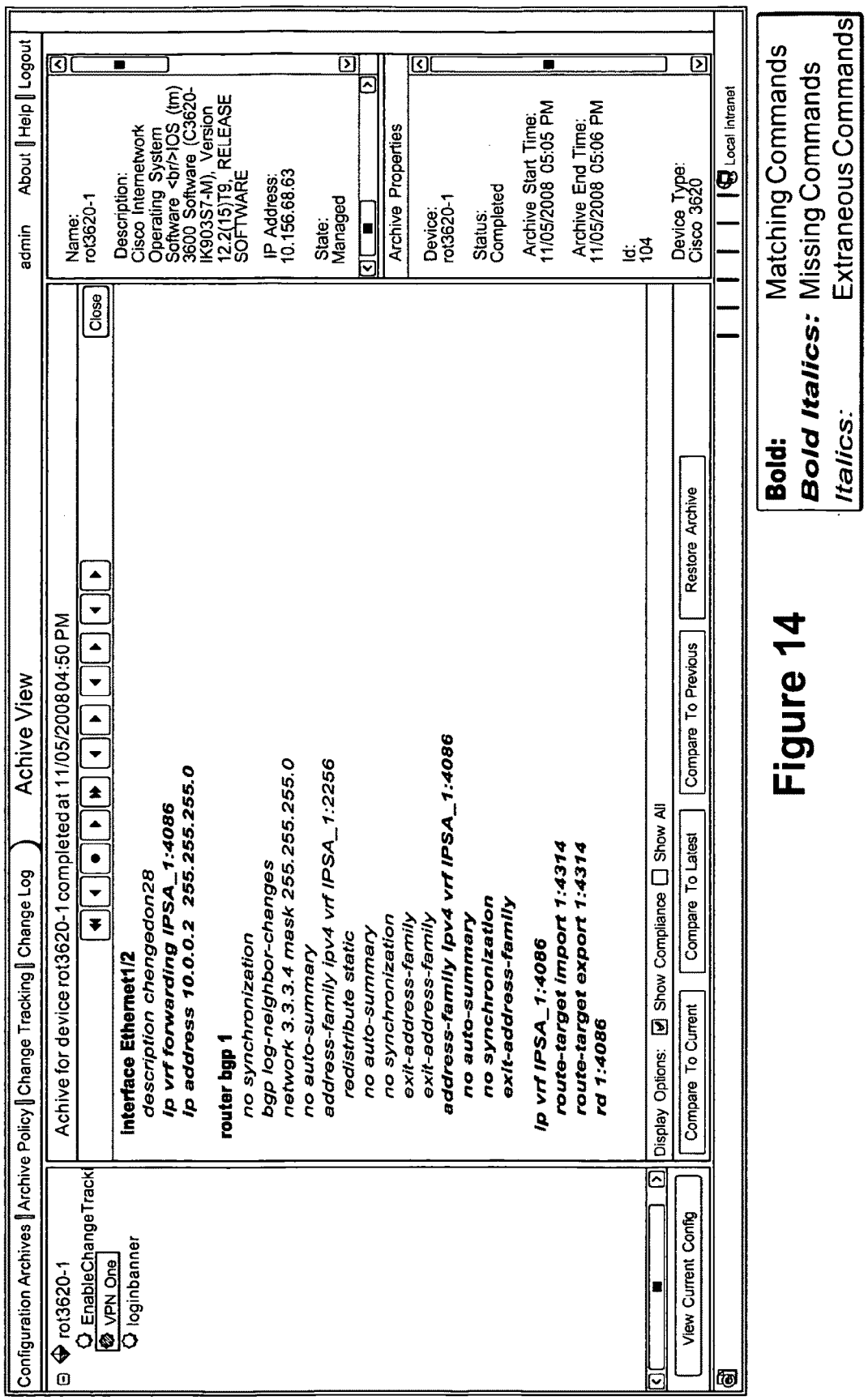
FIG. 14 illustrates an embodiment of a user interface display associated with service configuration assurance.

FIGS. 12, 13 and 14 illustrate example user interface display screens that can be used to present information regarding the result of a configuration audit. Commands in bold are matching commands that are present in both the expected and actual device configuration models. Commands in bold italics are missing and their absence will likely cause service outage or degradation. Commands in italics are extraneous service commands that have been added manually, which may also cause service outage or degradation. In FIG. 12, the actual device configuration model matches the expected device configuration model for the service instance VPN One so that all the commands are shown in bold.

In FIG. 13, the actual configuration model includes extraneous service configuration items for service instance VPN One not found in the expected device configuration model. These service configuration items, shown in italic, are likely the result of manual configuration item additions. In FIG. 14, in addition to the extraneous service configuration items shown in italic, missing service configuration items for the service instance VPN One that are in the expected device configuration model but not in the actual device configuration model are shown bold italics. In one embodiment, the system may provide a mechanism for the user or another system to invoke an action that causes the network device to be reconfigured, without disrupting service, to reflect the expected device configuration model for the network device (and therefore address the service outage or degradation).

FIG. 7 illustrates an embodiment of a method 700 that can be performed to provide service-impact event notification when a likely service-impacting configuration event occurs. Method 700 includes, at 720, receiving the results of the audit of the actual device configuration model based on the expected device configuration model. At 740, all services that are impacted by the likely service-impacting configuration event are identified. At 770, business, network and service information for the impacted services are retrieved and correlated. At 780 service-impact information for the impacted services is compiled. The service-impact information may include business, network and service information, actual vs. expected service configuration, the identity of the user that made the configuration change. At 790 a service-impact event notification is generated that reports the compiled information.

While FIGS. 2-7 illustrate various actions occurring in serial, it is to be appreciated that various actions illustrated in FIGS. 2-7 could occur substantially in parallel. By way of illustration, a first process could generate an expected device configuration model for a network device, a second process could generate an actual device configuration model for a network device, and a third process could audit the actual device configuration model and provide configuration event notification. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes retrieving one or more service definitions corresponding to one or more services that are provided by the network device; retrieving a realization algorithm for at least one of the services provided by the network device; and generating an expected device configuration model for the network device using the service realization algorithm. While executable instructions associated with the above method are described as being stored on a computer-readable medium, it is to be appreciated that executable instructions associated with other example methods described herein may also be stored on a computer-readable medium.

Figure 8:
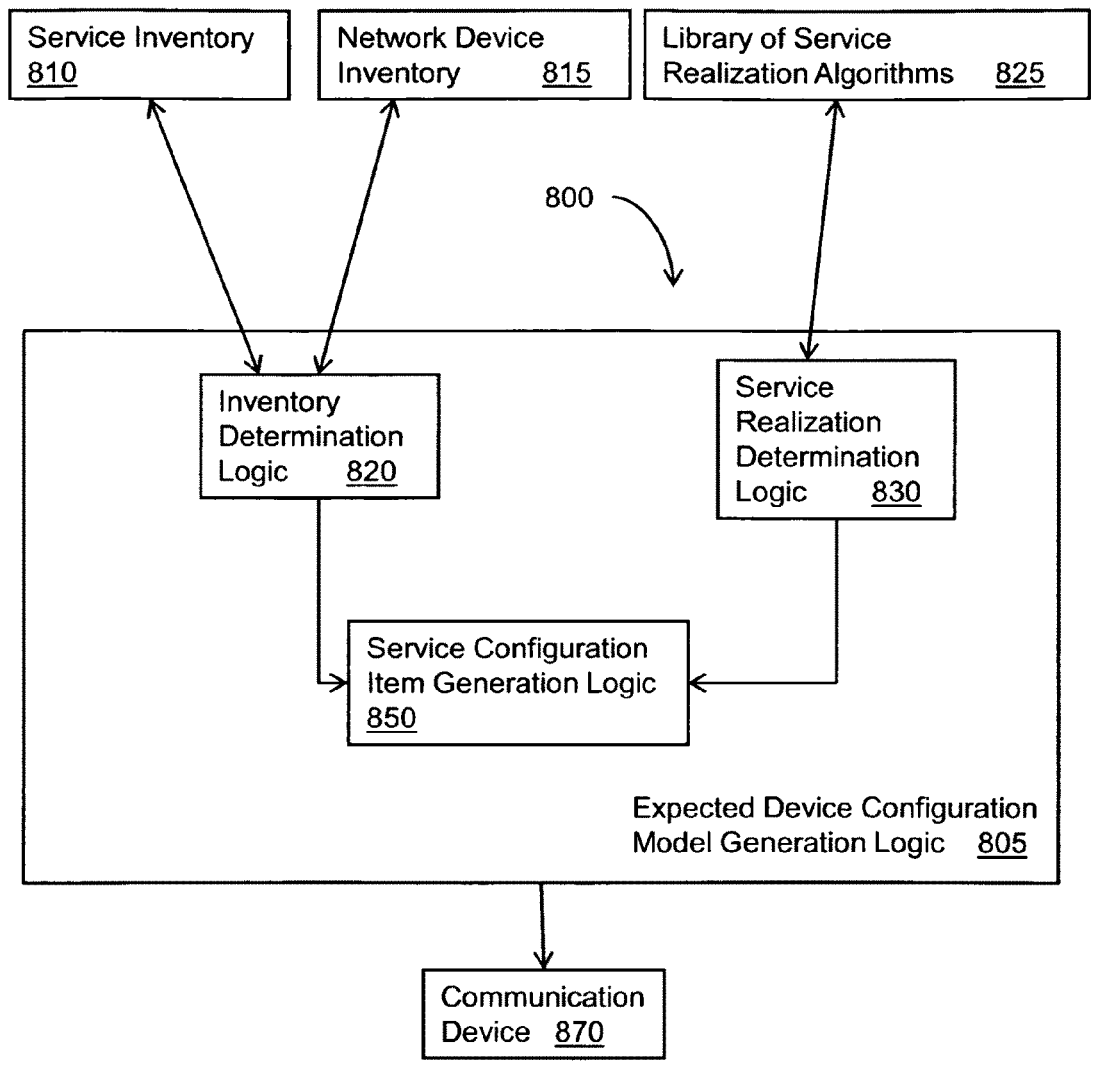
FIG. 8 illustrates an embodiment of a system associated with service configuration assurance.

FIG. 8 illustrates an embodiment of a computing system 800 that includes an expected device configuration model generation logic 805 that generates an expected device configuration model for a network device. The system 800 may include an inventory determination logic 820 to determine service definitions for the network device. The inventory determination logic 820 may access a service inventory 810 and a network device inventory 815 to determine the service definition for the network device. The system 800 may also include a service realization determination logic 830 to determine service realization algorithms for the network device associated with the service definitions for the network device. The service realization determination logic 830 may access a library of service realization algorithms 825. A service configuration item generation logic 850 may generate one or more service configuration items for the network device using the service realization algorithms and compile the service configuration items into an expected device configuration model. A communication device 870 communicates the one or more service configuration items in the expected device configuration model. The communication device may include, for example, a display or screen, a printer, or any other device that communicates information in a manner perceptible to a user.

Figure 9:
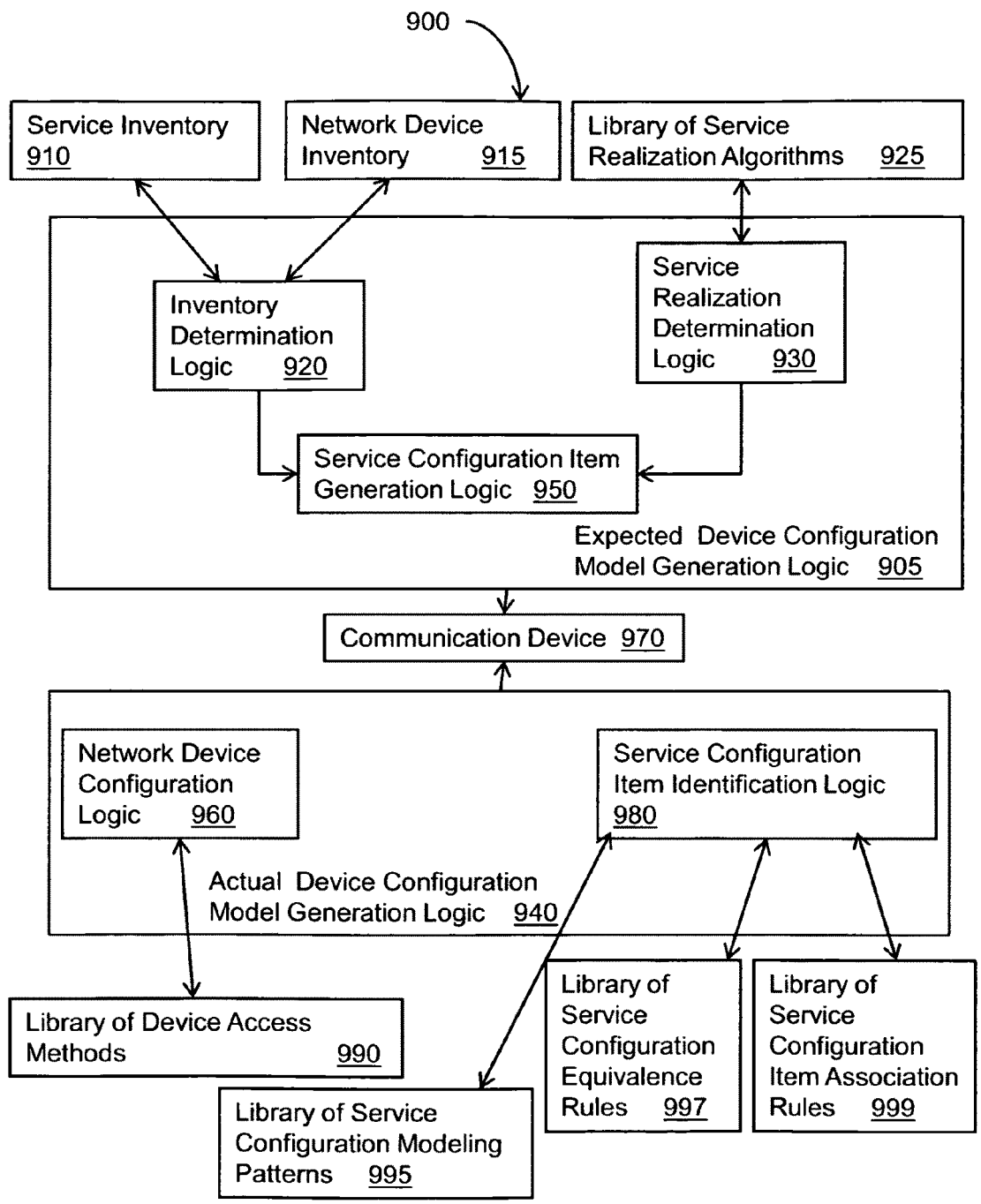
FIG. 9 illustrates an embodiment of a system associated with service configuration assurance.

FIG. 9 illustrates an embodiment of a computing system 900 that generates an expected device configuration model and an actual device configuration model for a network device. The computing system 900 includes some components that are similar to the components shown in FIG. 8. For example, the computing system 900 includes an expected device configuration model generation logic 905 that has an inventory determination logic 920, a service realization determination logic 930, a service configuration item logic 950, and a communication device 970.

The computing system 900 also includes an actual device configuration model generation logic 940. The actual device configuration model generation logic includes a device configuration logic 960 that retrieves a current configuration from the network device. The device configuration logic 960 may access a library of network device access methods 990 to retrieve a current configuration from the network device. The actual device configuration model logic 940 may also include service configuration item identification logic 980 to identify service-related service configuration items in the actual configuration. The service configuration item identification logic 980 may access libraries of service configuration modeling patterns 995, service configuration equivalence rules 997, and service configuration item association rules 999 that are used to parse the current configuration. The actual device configuration model generation logic 940 may merge the identified service-related service configuration items to compile an actual device configuration model for the network device. Both the actual device configuration model and the expected device configuration model may be displayed on the communication device 970.

Figure 10:
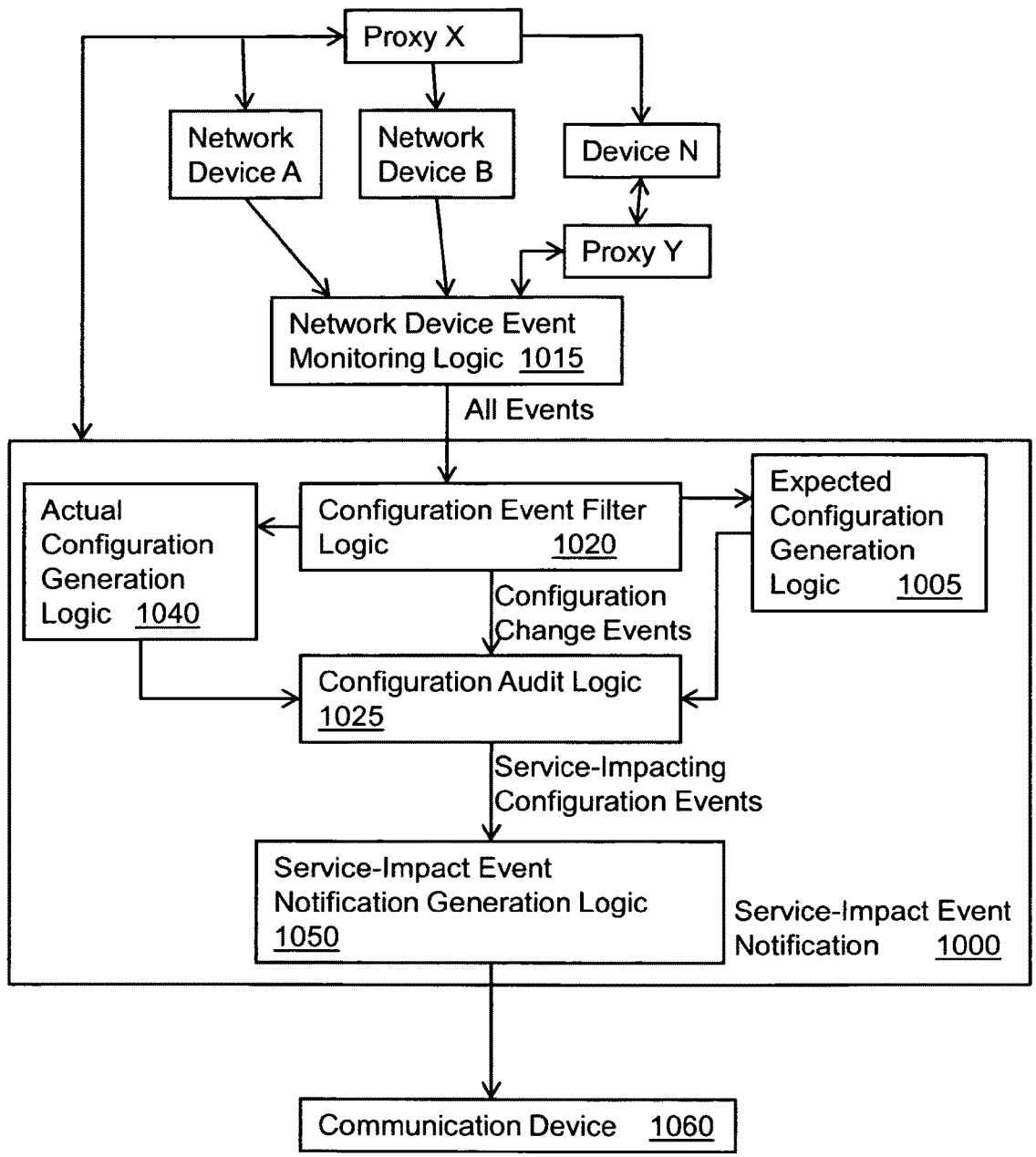
FIG. 10 illustrates another embodiment of a system associated with service configuration assurance.

FIG. 10 illustrates an example embodiment of a service-impact event notification system 1000 that communicates service-impact event notifications on a communication device 1060 when a likely service-impacting configuration change is detected. The system 1000 may access a network device event monitoring logic 1015 that monitors network device events. The monitoring logic may interface directly with network devices or through one or more third parties or proxies X, Y such as element or network management systems (EMS, NMS). A configuration event filter logic 1020 filters the monitored device events according to rules of a monitoring policy to identify likely service-impacting changes. The filter logic 1020 interacts with a configuration audit logic 1025 to initiate an audit of the network device's configuration when a likely service-impacting change is identified.

The configuration audit 1025 compares an expected device configuration model generated by an expected device configuration model generation logic 1005 to an actual device configuration model that is generated by an actual device configuration model generation logic 1040. This comparison may be performed using the methods shown in FIGS. 6A and 6B. The service-impact event notification system 1000 includes a service-impact event notification generation logic 1050 to generate a service-impact event notification when the monitored configuration change is deemed to be service-impacting based on the result of the audit. The service-impact event notification is communicated to a user on a communication device.

Figure 15:
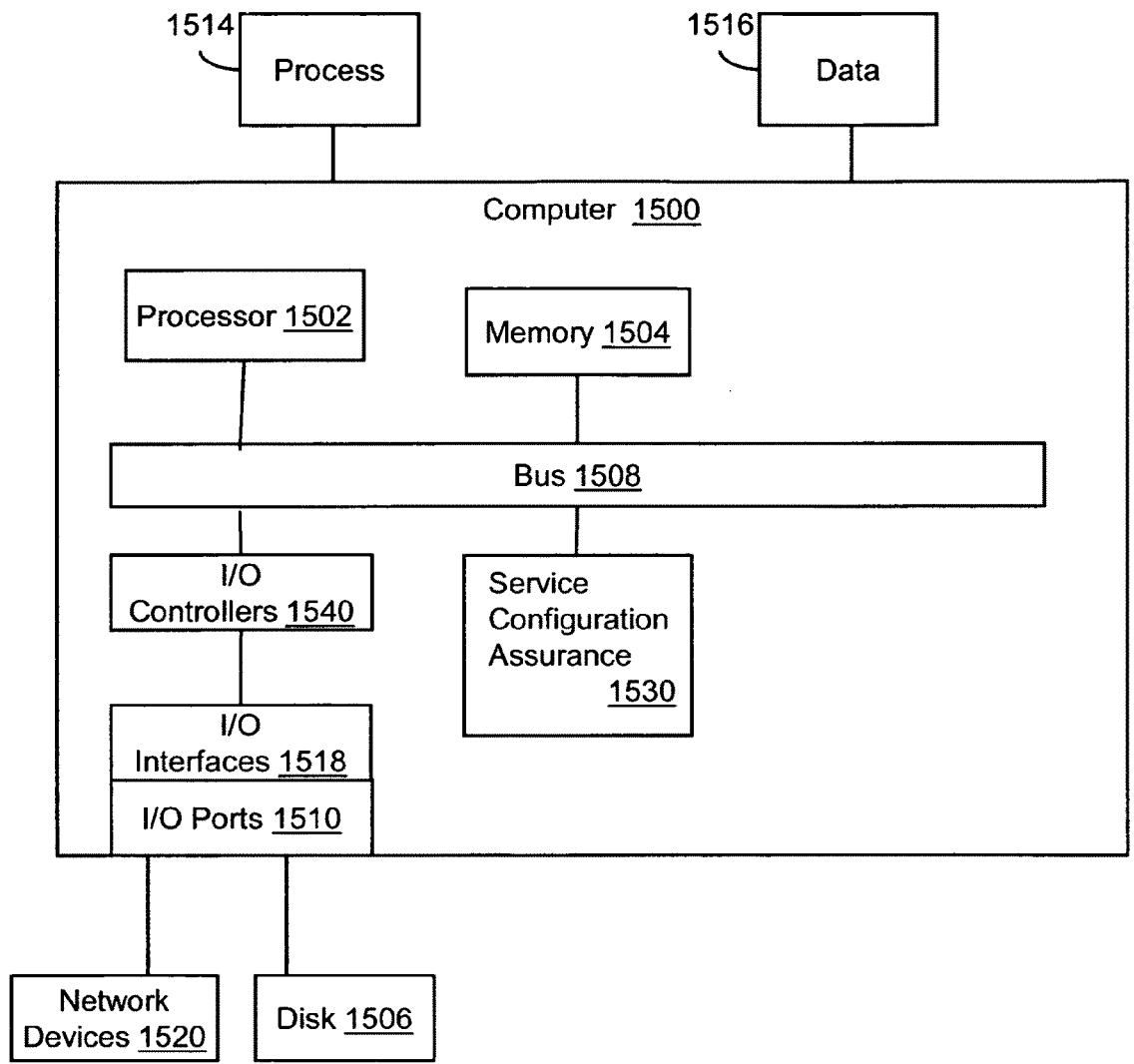
FIG. 15 illustrates an example computing environment in which example systems and methods, and equivalents, may operate.

FIG. 15 illustrates an example computing device in which example systems and methods described herein, and equivalents, may operate. The example computing device may be a computer 1500 that includes a processor 1502, a memory 1504, and input/output ports 1510 operably connected by a bus 1508. In one example, the computer 1500 may include a service configuration assurance logic 1530 configured to facilitate generation of an expected device configuration model for a network device. In different examples, the logic 1530 may be implemented in hardware, software, firmware, and/or combinations thereof. While the logic 1530 is illustrated as a hardware component attached to the bus 1508, it is to be appreciated that in one example, the service configuration assurance logic 1530 could be implemented in the processor 1502.

Thus, the service configuration assurance logic 1530 may provide means (e.g., hardware, software, firmware) for generating an expected device configuration model for a network device using one or more service definitions that correspond to services provided by the network device. The service configuration assurance logic 1530 may also provide means for retrieving a current configuration for the network; identifying service-related service configuration items in the current configuration, and merging the service-related service configuration items to compile an actual device configuration model. The service configuration assurance logic 1530 may also provide means for comparing the expected device configuration model and the actual device configuration model.

The various means may be implemented, for example, as an ASIC programmed to generate an expected device configuration model for a network device. The means may also be implemented as computer executable instructions that are presented to computer 1500 as data 1516 that are temporarily stored in memory 1504 and then executed by processor 1502.

Generally describing an example configuration of the computer 1500, the processor 1502 may be a variety of various processors including dual microprocessor and other multiprocessor architectures. A memory 1504 may include volatile memory and/or non-volatile memory. Non-volatile memory may include, for example, ROM, PROM, and so on. Volatile memory may include, for example, RAM, SRAM, DRAM, and so on.

A disk 1506 may be operably connected to the computer 1500 via, for example, an input/output interface (e.g., card, device) 1518 and an input/output port 1510. The disk 1506 may be, for example, a magnetic disk drive, a solid state disk drive, a floppy disk drive, a tape drive, a Zip drive, a flash memory card, a memory stick, and so on. Furthermore, the disk 1506 may be a CD-ROM drive, a CD-R drive, a CD-RW drive, a DVD ROM, and so on. The memory 1504 can store a process 1514 and/or a data 1516, for example. The disk 1506 and/or the memory 1504 can store an operating system that controls and allocates resources of the computer 1500.

The bus 1508 may be a single internal bus interconnect architecture and/or other bus or mesh architectures. While a single bus is illustrated, it is to be appreciated that the computer 1500 may communicate with various devices, logics, and peripherals using other busses (e.g., PCIE, 1394, USB, Ethernet). The bus 1508 can be types including, for example, a memory bus, a memory controller, a peripheral bus, an external bus, a crossbar switch, and/or a local bus.

The computer 1500 may interact with input/output devices via the i/o interfaces 1518 and the input/output ports 1510. Input/output devices may be, for example, a keyboard, a microphone, a pointing and selection device, cameras, video cards, displays, the disk 1506, the network devices 1520, and so on. The input/output ports 1510 may include, for example, serial ports, parallel ports, and USB ports.

The computer 1500 can operate in a network environment and thus may be connected to the network devices 1520 via the i/o interfaces 1518, and/or the i/o ports 1510. Through the network devices 1520, the computer 1500 may interact with a network. Through the network, the computer 1500 may be logically connected to remote computers. Networks with which the computer 1500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A computer-implemented method comprising:
   retrieving service information for a network device from a service-provisioning inventory system, the service information comprising one or more service definitions for the network device, the network device characterized by a device type;
   generating one or more expected service configuration items for the network device based at least in part on the retrieved service information;
   merging the expected service configuration items to compile an expected device configuration model for the network device;
   identifying service-related service configuration items in the current device configuration;

merging the identified service configuration items to compile the actual device configuration model of the network device;

comparing the expected device configuration model with the actual device configuration model by:

for at least one service provided by the network device, tagging expected service configuration items that realize the service with a service identifier for the service;

matching tagged expected service configuration items with configuration items in the actual device configuration model;

applying the service identifier tags from expected service configuration items to matching configuration items in the actual device configuration model;

identifying a configuration item in the actual device configuration model that includes a service identifier tag and for which there is no corresponding expected service configuration item;

tagging the identified configuration item with service identifiers for expected service configuration items that define a context for the identified configuration item; and communicating the identified configuration item and the service identifier tags to the user.

2. The computer-implemented method of claim 1 where the step of retrieving service information comprises retrieving service realization algorithms specific to the device type and service types and where the expected service configuration items are generated based at least in part on the service realization algorithms.

3. The computer-implemented method of claim 1 comprising displaying the actual device configuration model for the network device to the user.

4. The computer-implemented method of claim 3 where the actual device configuration model for the network device is generated by:

retrieving a device access method for the network device from a library of network device access methods;

retrieving service configuration modeling patterns for the network device type;

retrieving the current device configuration from the network device using the network device access method; and identifying the service-related service configuration items in the current device configuration using the service configuration modeling patterns.

5. The computer-implemented method of claim 3 comprising communicating results of the comparison to the user.

6. The computer-implemented method of claim 5 where the comparing the expected device configuration model with the actual device configuration model is performed by:

retrieving service configuration modeling equivalence rules associated with the device type; and matching the expected service configuration items with configuration items in the actual device configuration model based on the service configuration modeling equivalence rules.

7. The computer-implemented method of claim 1 comprising communicating matching configuration items and service identifier tags to the user.

8. The computer-implemented method of claim 1 comprising identifying expected service configuration items in the expected device configuration model for which there is no corresponding service configuration item in the actual device configuration model and communicating the service configuration items and the service identifier tags to the user.

9. The computer-implemented method of claim 1 comprising:

retrieving service configuration modeling patterns for the device type;

determining whether the identified configuration items match any of the service configuration modeling patterns;

and communicating the matching service configuration items and the service identifier tags to the user.

10. The computer-implemented method of claim 1 comprising:

retrieving service configuration item association rules for the device type;

for each identified configuration item, associating any expected service configuration items using service configuration association rules;

tagging each identified configuration item with service identifiers for all expected service configuration items associated using service configuration association rules; and communicating the configuration items and the service identifier tags to the user.

11. The computer-implemented method of claim 1 comprising monitoring device events for the network device and where the comparing of the expected device configuration model and the actual device configuration model is performed when a monitored device event meets rules specified by a monitoring policy.

12. The computer-implemented method of claim 1 comprising identifying a service-impact event when the comparing of the expected device configuration model and actual device configuration model indicate that one or more services is adversely affected by a device event and generating a service-impact event notification that identifies service impact information for the service-impact event.

13. The computer-implemented method of claim 1 comprising, in response to a user or system command, reconfiguring the network device to the expected device configuration model.

14. A computing system comprising:

an expected device configuration model generation logic comprising:

an inventory determination logic to access service-provisioning inventory system to determine service definitions for a network device;

a service realization determination logic to determine service realization information for the network device associated with the service definitions for the network device; and an expected service configuration item generation logic to generate one or more expected service configuration items for the network device using the service realization information and to compile the expected service configuration items into an expected device configuration model;

an actual device configuration model generation logic comprising:

a service configuration item identification logic to identify service-related service configuration items in a current configuration for the network device and to merge the identified service-related service configuration items to compile an actual device configuration model for the network device;

an audit logic configured to compare the expected device configuration model to the actual device configuration model by:

for at least one service provided by the network device, tagging expected service configuration items that realize the service with a service identifier for the service;
matching tagged expected service configuration items with configuration items in the actual device configuration model;
applying the service identifier tags from expected service configuration items to matching configuration items in the actual device configuration model;
identifying a configuration item in the actual device configuration model that includes a service identifier tag and for which there is no corresponding expected service configuration item;
tagging the identified configuration item with service identifiers for expected service configuration items that define a context for the identified configuration item; and
a communication device configured to communicate the identified configuration item and the service identifier tags to the user.

15. The computing system of claim 14 comprising:
a network device configuration logic to retrieve the current configuration from the network device;
where the communication device communicates the service-related service configuration items in the actual device configuration model.

16. The computing system of claim 14 where the communication device communicates a result of the comparison.

17. The computing system of claim 14 comprising a configuration event filter logic to monitor device events and trigger the audit logic to compare the expected device configuration model to the actual device configuration model when a monitored device event meets rules specified by a monitoring policy.

18. The computing system of claim 14 comprising a service-impact event notification generation logic to generate a service-impact event notification based on the comparison of the expected device configuration model and the actual device configuration model.

19. A non-transitory computer-readable medium storing computer-executable instructions that when executed by a computer cause the computer to perform a method comprising:
retrieving service information for a network device from a service-provisioning inventory system, the service information comprising one or more service definitions for the network device, the network device characterized by a device type;
generating one or more expected service configuration items for the network device based at least in part on the retrieved service information;
merging the expected service configuration items to compile an expected device configuration model for the network device;
identifying service-related service configuration items in the current device configuration;
merging the identified service configuration items to compile the actual device configuration model of the network device;
comparing the expected device configuration model with the actual device configuration model by:
for at least one service provided by the network device, tagging expected service configuration items that realize the service with a service identifier for the service;
matching tagged expected service configuration items with configuration items in the actual device configuration model;
applying the service identifier tags from expected service configuration items to matching configuration items in the actual device configuration model;
identifying a configuration item in the actual device configuration model that includes a service identifier tag and for which there is no corresponding expected service configuration item;
retrieving service configuration item association rules for the device type;
for each identified configuration item, associating any expected service configuration items using service configuration association rules;
tagging each identified configuration item with service identifiers for all expected service configuration items associated using service configuration association rules; and
communicating the identified configuration item and the service identifier tags to the user.

20. The non-transitory computer-readable medium of claim 19 where the instructions include identifying expected service configuration items in the expected device configuration model for which there is no corresponding service configuration item in the actual device configuration model and communicating the service configuration items and the service identifier tags to the user.

21. The non-transitory computer-readable medium of claim 20 where the instructions include:
tagging the identified configuration item with service identifiers for expected service configuration items that define a context for the identified configuration item; and
communicating the configuration items and the service identifier tags to the user.

22. The non-transitory computer-readable medium of claim 19 where the instructions include monitoring device events on the network device and comparing the actual device configuration model to the expected device configuration model when a monitored device event meets rules specified by a monitoring policy.

23. The non-transitory computer-readable medium of claim 19 where the instructions include generating service-impact event notifications that communicate service-impact information based on the results of the comparison between the actual device configuration model and the expected device configuration model.

24. A system, comprising:
means for generating an expected device configuration model for a network device by retrieving one or more service definitions for the network device from a service-provisioning inventory system and using the one or more service definitions that correspond to services provided by the network device;
means for retrieving a current configuration for the network; identifying service-related service configuration items in the current configuration, and merging the service-related service configuration items to compile an actual device configuration model of the network device; and
means for comparing the expected device configuration model and the actual device configuration model by:
for at least one service provided by the network device, tagging expected service configuration items that realize the service with a service identifier for the service;

matching tagged expected service configuration items with configuration items in the actual device configuration model;
applying the service identifier tags from expected service configuration items to matching configuration items in the actual device configuration model;
identifying a configuration item in the actual device configuration model that includes a service identifier tag and for which there is no corresponding expected service configuration item;

tagging the identified configuration item with service identifiers for expected service configuration items that define a context for the identified configuration item; and means for communicating the identified configuration item and the service identifier tags to the user.

* * * * *

UNITED STATES PATENT AND TRADEMARK OFFICE
CERTIFICATE OF CORRECTION

PATENT NO. : 8,370,462 B2  Page 1 of 1
APPLICATION NO. : 12/322458
DATED : February 5, 2013
INVENTOR(S) : Pelletier et al.

It is certified that error appears in the above-identified patent and that said Letters Patent is hereby corrected as shown below:

On the Title Page, in column 2, Item (74) under "Attorney, Agent, or Firm", line 1, delete "Kraguljac Law Group, LL" and insert -- Kraguljac Law Group, LLC --, therefor.

In the Claims:

In column 17, line 25, in Claim 15, after "device;" insert -- and --.

Signed and Sealed this
Seventh Day of May, 2013

Teresa Stanek Rea
*Acting Director of the United States Patent and Trademark Office*